(12) United States Patent
Isayama et al.

(10) Patent No.: US 8,661,840 B2
(45) Date of Patent: Mar. 4, 2014

(54) LIQUID CIRCULATION HEATING SYSTEM

(75) Inventors: Yasuhiko Isayama, Osaka (JP); Kazuo Nakatani, Osaka (JP); Takayuki Takatani, Shiga (JP); Noriho Okaza, Osaka (JP); Takashi Sawada, Nara (JP); Yuuki Yamaoka, Shiga (JP); Masahiro Ohama, Nara (JP)

(73) Assignee: Panasonic Corporation, Osaka (JP)

( * ) Notice: Subject to any disclaimer, the term of this patent is extended or adjusted under 35 U.S.C. 154(b) by 1074 days.

(21) Appl. No.: 12/693,774

(22) Filed: Jan. 26, 2010

(65) Prior Publication Data
US 2010/0192606 A1    Aug. 5, 2010

(30) Foreign Application Priority Data

Jan. 30, 2009   (JP) ................................. 2009-019236

(51) Int. Cl.
*F25B 27/00*    (2006.01)
(52) U.S. Cl.
USPC ........ 62/235.1; 165/48.2; 62/238.7; 62/238.6
(58) Field of Classification Search
USPC ......... 62/235.1, 236; 165/48.2, 100–101, 103
See application file for complete search history.

(56) References Cited

U.S. PATENT DOCUMENTS

| | | | | |
|---|---|---|---|---|
| 4,012,920 A | * | 3/1977 | Kirschbaum | 62/235.1 |
| 4,165,037 A | * | 8/1979 | McCarson | 237/1 R |
| 4,190,199 A | * | 2/1980 | Cawley et al. | 126/586 |
| 4,308,042 A | * | 12/1981 | Ecker | 62/82 |
| 5,685,152 A | * | 11/1997 | Sterling | 60/641.8 |

FOREIGN PATENT DOCUMENTS

| | | |
|---|---|---|
| DE | 33 30 479 | 3/1985 |
| EP | 2 056 025 A1 | 5/2009 |
| FR | 2 896 857 | 8/2007 |
| JP | 54-091838 | 7/1979 |
| JP | 59-023055 | 2/1984 |
| JP | 2002-162109 A | 6/2002 |
| JP | 2002-181381 | 6/2002 |
| JP | 2002-257364 | 9/2002 |
| JP | 2008-039306 A | 2/2008 |

\* cited by examiner

*Primary Examiner* — Frantz Jules
*Assistant Examiner* — Steve Tanenbaum
(74) *Attorney, Agent, or Firm* — Hamre, Schumann, Mueller & Larson, P.C.

(57) ABSTRACT

A liquid circulation heating system performs air-heating by heating a liquid to produce a heated liquid and releasing heat of the heated liquid from a heating radiator. This liquid circulation heating system includes: a heat pump circuit for circulating a refrigerant, having a radiator for heating the liquid by radiating heat from the refrigerant; and a solar heating apparatus for heating the liquid by solar heat. In this liquid circulation heating system, a first passage passing through the radiator and a second passage passing through the solar heating apparatus are formed as passages through which the liquid flows to produce the heated liquid.

17 Claims, 6 Drawing Sheets

LIQUID CIRCULATION HEATING SYSTEM

BACKGROUND OF THE INVENTION

1. Field of the Invention

The present invention relates to a liquid circulation heating system for performing air-heating using a liquid.

2. Description of Related Art

Conventionally, there has been known a liquid circulation heating system for producing hot water by a boiler or an electric heater and performing air-heating using the hot water produced. In recent years, the use of a heat pump capable of producing hot water with high efficiency has been considered as an alternative heat source to a boiler and an electric heater. For example, JP 2008-39306 A proposes a liquid circulation heating system for producing hot water by a heat pump and storing the produced hot water in a hot water storage tank. In this liquid circulation heating system, the hot water stored in the hot water storage tank is fed to, for example, a heating radiator placed indoors to radiate its heat, and then returned to the hot water storage tank.

In the liquid circulation heating system having such a configuration, it is conceived that the power consumption of the heat pump is reduced by utilizing solar heat (which is obtained by converting solar energy into thermal energy) to produce hot water. For example, JP 2002-162109 A proposes a hot water supply system using a solar collector, although it is not a liquid circulation heating system. In this hot water supply system, a heat exchanger is provided at a lower position in a hot water storage tank. A heating medium is circulated through a circulation passage passing through the heat exchanger and the solar collector, so that the water in the hot water storage tank is heated by solar heat.

SUMMARY OF THE INVENTION

When solar heat is utilized in the system having such a configuration as disclosed in JP 2002-162109 A, however, the water stored in the hot water storage tank is heated entirely by convection. Therefore, if the construction including the solar collector disclosed in JP 2002-162109 A is combined with the liquid circulation heating system disclosed in JP 2008-39306 A, more than the necessary amount of water is heated, which causes an ineffective use of solar heat.

In view of the above circumstances, it is an object of the present invention to provide a liquid circulation heating system capable of utilizing solar heat effectively.

The present invention provides a liquid circulation heating system for performing air-heating by heating a liquid to produce a heated liquid and releasing heat of the heated liquid from a heating radiator. This system includes: a heat pump circuit for circulating a refrigerant, having a refrigerant radiator for heating the liquid by radiating heat from the refrigerant; and a solar heating apparatus for heating the liquid by solar heat. In this system, a first passage passing through the refrigerant radiator and a second passage passing through the solar heating apparatus are formed as passages through which the liquid flows to produce the heated liquid.

According to the above-mentioned configuration, it is possible to heat the liquid by allowing it to flow through the passage passing through the solar heating apparatus. Therefore, a required amount of the liquid can be heated effectively by solar heat. Accordingly, the present invention makes it possible to reduce unnecessary heating to utilize solar heat effectively.

DETAILED DESCRIPTION OF THE INVENTION

Hereinafter, embodiments of the present invention will be described with reference to the accompanying drawings. It should be noted, however, that the embodiments described below are merely examples of the present invention, and should not be construed to limit the scope of the present invention.

First Embodiment

Figure 1:
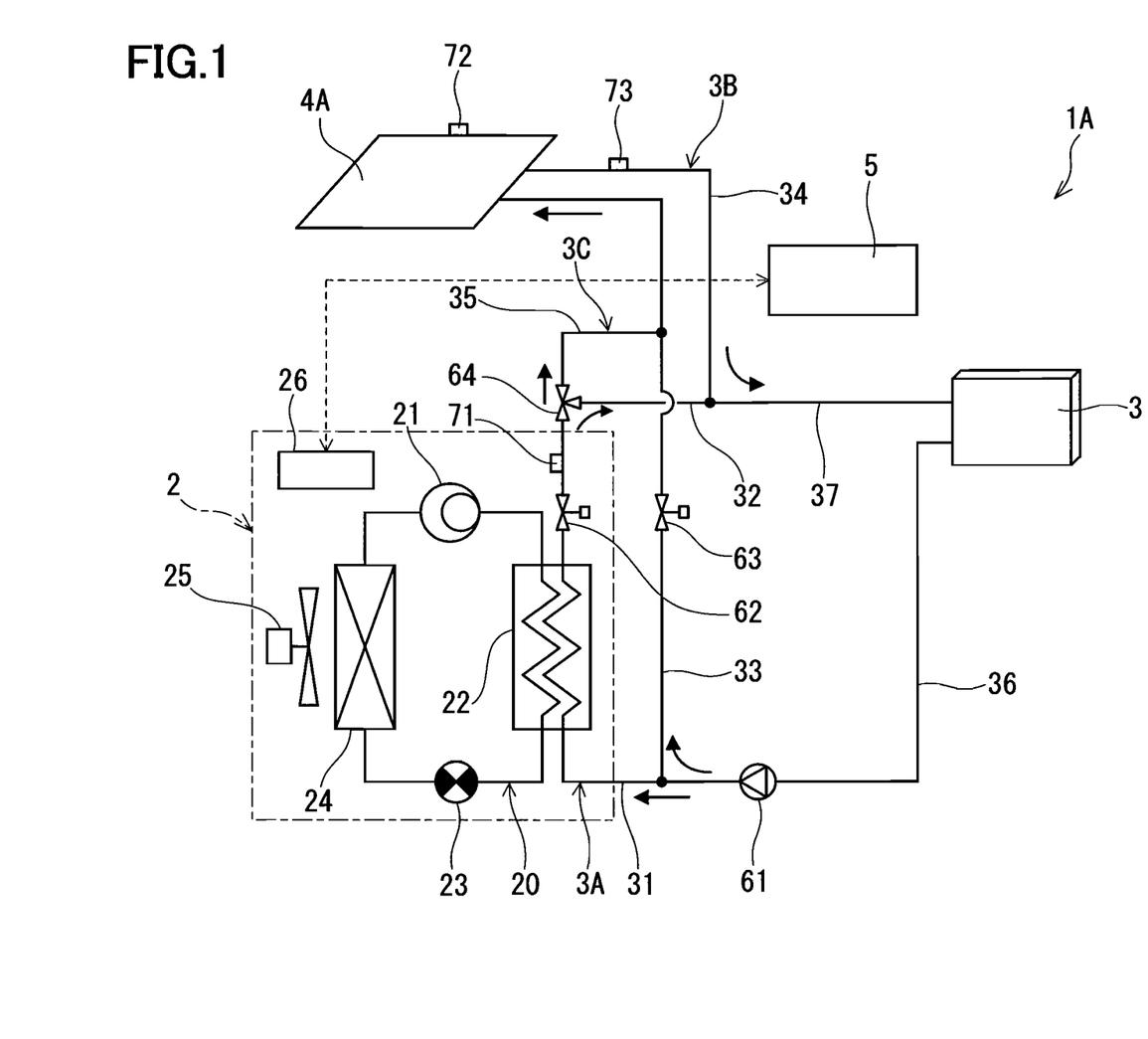
FIG. 1 is a schematic diagram of a liquid circulation heating system according to a first embodiment of the present invention.

FIG. 1 shows a liquid circulation heating system 1A according to a first embodiment of the present invention. This liquid circulation heating system 1A heats a liquid to produce a heated liquid, releases heat of the heated liquid from a heating radiator 3, and thereby performs air-heating, for example, in a room. Specifically, the liquid circulation heating system 1A includes the heating radiator 3, a heat pump 2 and a solar heating apparatus 4A as means for heating the liquid to produce the heated liquid, and an overall controller 5 for controlling the entire system.

In the present embodiment, the heating radiator 3 is connected directly to the heat pump 2 and the solar heating apparatus 4A by pipes, so that there is a continuous flow path available for the liquid flow. As the liquid, for example, an antifreeze liquid containing propylene glycol or the like dissolved in water can be used, but water is preferably used because it is available at low cost and in large quantities. The following description will be made on the assumption that the liquid is water and the heated liquid is hot water.

The heat pump 2 has a heat pump circuit 20 for circulating a refrigerant. This heat pump circuit 20 includes a compressor 21 for compressing the refrigerant, a radiator (refrigerant radiator) 22 for radiating heat from the compressed refrigerant, an expansion valve 23 for expanding the refrigerant that has radiated heat, and an evaporator 24 for evaporating the expanded refrigerant. These components 21 to 24 are connected in series by pipes. The heat pump 2 further includes a heat pump controller 26 for controlling the compressor 21 and the expansion valve 23 according to an instruction from the overall controller 5. An expander for recovering power from the expanding refrigerant also can be used instead of the expansion valve 23.

In the radiator 22, heat is exchanged between the refrigerant and the water flowing through the radiator 22 so as to heat the water. In the evaporator 24, heat is exchanged between the refrigerant and air blown by a fan 25, and thereby the refrigerant absorbs heat. As a refrigerant, a chlorofluorocarbon alternative, ammonia, or the like can be used, but it is preferable to use carbon dioxide that reaches a supercritical state when it is compressed, or to use HFO-1234 having a low global warming potential, alone or as a mixture thereof.

The solar heating apparatus 4A heats the water by solar heat. In the present embodiment, as the solar heating apparatus 4A, a solar collector that provides solar heat directly to the water is used. Preferably, the solar collector can heat the water to a high temperature in a single passage through the solar collector. One example of such a solar collector is a vacuum tube type solar collector.

The heating radiator 3 is a device for radiating heat from the hot water flowing therethrough, and has an inlet for allowing the hot water to flow thereinto, and an outlet for allowing the hot water to flow therefrom after the hot water radiates its heat. As the heating radiator 3, for example, a radiator to be placed in a room of a building may be used. A hot water panel to be laid on a floor also may be used.

Next, how the heating radiator 3, the radiator 22, and the solar heating apparatus 4A are connected will be described.

A first supply pipe 31 for supplying the water to the radiator 22 and a first recovery pipe 32 for recovering the water heated in the radiator 22 are connected to the radiator 22. The first recovery pipe 32 is provided with a first temperature sensor 71 for detecting the temperature of the water heated in the radiator 22.

A second supply pipe 33 for supplying the water to the solar heating apparatus 4A and a second recovery pipe 34 for recovering the water heated in the solar heating apparatus 4A are connected to the solar heating apparatus 4A. The solar heating apparatus 4A is provided with a second temperature sensor 72 for detecting the surface temperature of the solar collector. The second recovery pipe 34 is provided with a third temperature sensor 73 for detecting the temperature of the water heated in the solar heating apparatus 4A.

The upstream end of the first supply pipe 31 and the upstream end of the second supply pipe 33 are connected to one end (a first end) of a main pipe 36. The other end (a second end) of the main pipe 36 is connected to the outlet of the heating radiator 3. The downstream end of the first recovery pipe 32 and the downstream end of the second recovery pipe 34 are connected to one end (a first end) of a junction pipe 37. The other end (a second end) of the junction pipe 37 is connected to the inlet of the heating radiator 3. That is, the main pipe 36, the first supply pipe 31, the first recovery pipe 32, and the junction pipe 37 form a first passage 3A passing through the radiator 22. The main pipe 36, the second supply pipe 33, the second recovery pipe 34, and the junction pipe 37 form a second passage 3B passing through the solar heating apparatus 4A.

The main pipe 36 is provided with a pump 61 for allowing the water to flow from the other end of the main pipe 36 to the one end thereof. The first recovery pipe 32 is provided with an opening-adjustable first open/close valve 62 on the upstream side of the first temperature sensor 71. The second supply pipe 33 is provided with an opening-adjustable second open/close valve 63. The first valve 62 may be provided in the first supply pipe 31.

Further, in the present embodiment, a third passage 3C is formed. This third passage 3C passes through the radiator 22 and the solar heating apparatus 4A in this order (i.e., it passes through the upstream portion of the first passage 3A and then through the downstream portion of the second passage 3B). Specifically, a bypass pipe 35 connects an intermediate point of the first recovery pipe 32 located on the downstream side of the first open/close valve 62 and the first temperature sensor 71 to an intermediate point of the second supply pipe 33 located on the downstream side of the second open/close valve 63. In the present embodiment, a three-way valve 64 is provided on the downstream side of the first temperature sensor 71 in the first recovery pipe 32. This three-way valve 64 is connected to one end of the bypass pipe 35. The three-way valve 64 determines whether the water heated in the radiator 22 should be allowed to flow to the downstream side of the intermediate point of the first recovery pipe 32 or to flow to the bypass pipe 35, and corresponds to the switching member of the present invention. It should be noted that the switching member of the present invention is not necessarily be the three-way valve 64. The switching member may be composed of an open/close valve provided in the bypass pipe 35 and an open/close valve provided on the downstream of the intermediate point of the first recovery pipe 32 to which the bypass pipe 35 is connected.

Figure 2:
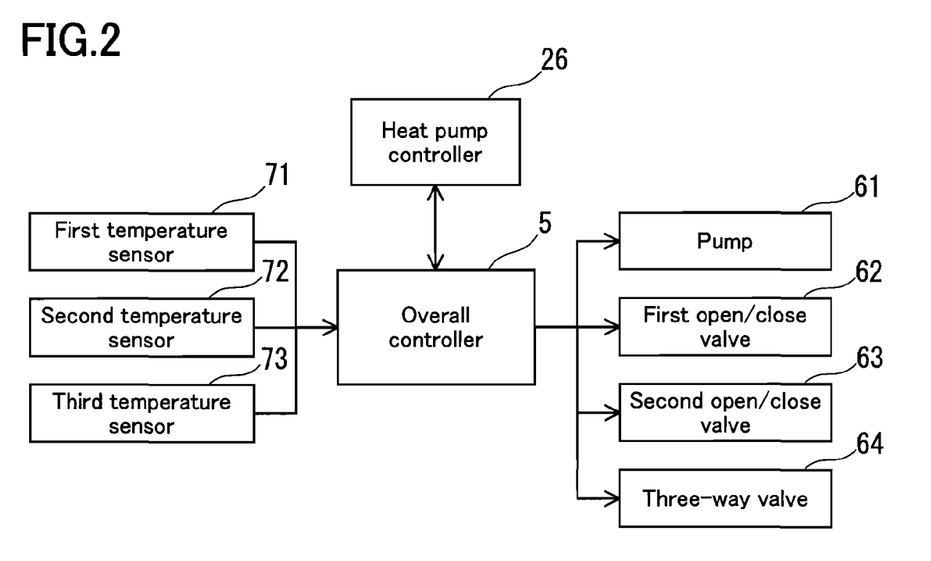
FIG. 2 is a block diagram of the liquid circulation heating system shown in FIG. 1.

The above-mentioned heat pump controller 26, the first to third temperature sensors 71 to 73, the pump 61, the first open/close valve 62, the second open/close valve 63, and the three-way valve 64 are connected to the overall controller 5 (see FIG. 2). The overall controller 5 may be a microcomputer, a digital signal processor (DSP), or the like. According to a previously stored program, the overall controller 5 issues a command to the heat pump controller 26 and controls the pump 61 and the respective valves 62 to 64 based on the temperatures detected by the first to third temperature sensors 71 to 73, and the like.

Next, the control operations performed by the overall controller 5 are described specifically.

⟨Air-Heating Operation Using Heat Pump Alone⟩

In the case where the amount of sunlight received is insufficient, for example, on a rainy day, (e.g., in the case where the amount of sunlight detected by a sunlight amount sensor is a specified amount or less), when a user turns on a heating switch (not shown), the overall controller 5 performs an air-heating operation using the heat pump alone. Specifically, the overall controller 5 opens the first open/close valve 62 fully and closes the second open/close valve 63 fully. The overall controller 5 also switches the three-way valve 64 so that the upstream side of the first recovery pipe 32 communicates with the downstream side thereof. Then, the overall controller 5 rotates the pump 61 and sends an operation start signal to the heat pump controller 26. Thereby, the water is heated in the radiator 22 to produce hot water, and the produced hot water is fed to the heating radiator 3. Thus air-heating is performed. The overall controller 5 also controls the rotational rate of the pump 61 to regulate the flow rate of the water flowing through the first passage 3A so that the temperature of the water detected by the first temperature sensor 71 becomes a specified temperature (for example, 65° C.).

⟨Air-Heating Operation Using Solar Heating Apparatus Alone⟩

In the case where a sufficient amount of sunlight is received and the surface temperature of the solar collector detected by the second temperature sensor 72 is equal to or higher than a predetermined target temperature (for example, 70° C.), when a user turns on a heating switch (not shown) for selecting an energy saving operation using the solar heating apparatus 4A, the overall controller 5 performs an air-heating operation using the solar heating apparatus alone. Specifically, the overall controller 5 closes the first open/close valve 62 fully and opens the second open/close valve 63 fully. Then, the overall controller 5 rotates the pump 61. Thereby, the water is heated in the solar heating apparatus 4A to produce hot water, and the produced hot water is fed to the heating radiator 3. Thus, air-heating is performed. The overall controller 5 also controls the rotational rate of the pump 61 to regulate the flow rate of the water flowing through the second passage 3B so that the temperature of the water detected by the third temperature sensor 73 becomes a specified temperature (for example, 65° C.).

⟨Parallel Air-Heating Operation⟩

In the case where a sufficient amount of sunlight is received and the surface temperature of the solar collector detected by the second temperature sensor 72 is equal to or higher than the above-mentioned target temperature, when a user turns on a heating switch (not shown) for selecting a quick heating in the heating radiator 3, the overall controller 5 performs a parallel air-heating operation for heating the water simultaneously by using both the heat pump 2 and the solar heating apparatus 4A. Specifically, the overall controller 5 opens both the first open/close valve 62 and the second open/close valve 63 fully. The overall controller 5 also switches the three-way valve 64 so that the upstream side of the first recovery pipe 32 communicates with the downstream side thereof. Then, the overall controller 5 rotates the pump 61 and sends an operation start signal to the heat pump controller 26. Thereby, the water is heated in the radiator 22 and the solar heating apparatus 4A in parallel to produce hot water, and the produced hot water is fed to the heating radiator 3. Thus air-heating is performed. The overall controller 5 also controls the rotational rate of the pump 61, the opening of the first open/close valve 62, and the opening of the second open/close valve 63, based on the temperature of the water detected by the third temperature sensor 73, to regulate the flow rate of the water flowing through the first passage 3A and the flow rate of the water flowing through the second passage 3B.

As described above, in the present embodiment, the three-way valve 64 is provided, which enables the above-mentioned parallel air-heating operation. Therefore, a quick heating is achieved in the heating radiator 3.

⟨Serial Air-Heating Operation⟩

In the case where a sufficient amount of sunlight is received, if a user turns on a heating switch (not shown) for selecting a high temperature energy saving operation in the heating radiator 3, the overall controller 5 also may perform a serial air-heating operation for heating the water using the heat pump 2 and then further heating the water using the solar heating apparatus 4A. In this case, the overall controller 5 opens the first open/close valve 62 fully and closes the second open/close valve 63 fully, and switches the three-way valve 64 so that the upstream side of the first recovery pipe 32 communicates with the bypass pipe 35. Then, the overall controller 5 rotates the pump 61 and sends an operation start signal to the heat pump controller 26. Thereby, the water flows through the third passage 3C. During the flow through the third passage 3C, the water first is heated to some extent in the radiator 22 (for example, the temperature of the water is raised to 40 to 42° C.), and then the water further is heated in the solar heating apparatus 4A. Thus, hot water is produced. This hot water is fed to the heating radiator 3, where air-heating is performed. The overall controller 5 also controls the rotational rate of the pump 61 to regulate the flow rate of the water flowing through the third passage 3C so that the temperature of the water detected by the third temperature sensor 73 becomes a specified temperature (for example, 70° C.).

As described above, in the liquid circulation heating system 1A of the present embodiment, it is possible to heat the water by allowing it to flow through the second passage 3B or the third passage 3C, each passing through the solar heating apparatus 4A. Therefore, a required amount of the water can be heated effectively by solar heat. Accordingly, the present embodiment makes it possible to reduce unnecessary heating to utilize solar heat effectively.

The first supply pipe 31 and the second supply pipe 33, respectively, may be provided with pumps to omit the first open/close valve 62 and the second open/close valve 63. However, in the case where the pump 61 is provided in the main pipe 36 that branches into the first supply pipe 31 and the second supply pipe 33, as in the present embodiment, the total number of pumps in the system can be reduced, which simplifies the configuration of the system.

Moreover, in the present embodiment, the bypass pipe 35 and the three-way valve 64 are provided, which enables the above-mentioned serial air-heating operation. Therefore, the temperature increase required from the heat pump 2 can be reduced. As a result, energy conservation further can be enhanced.

Second Embodiment

Figure 3:
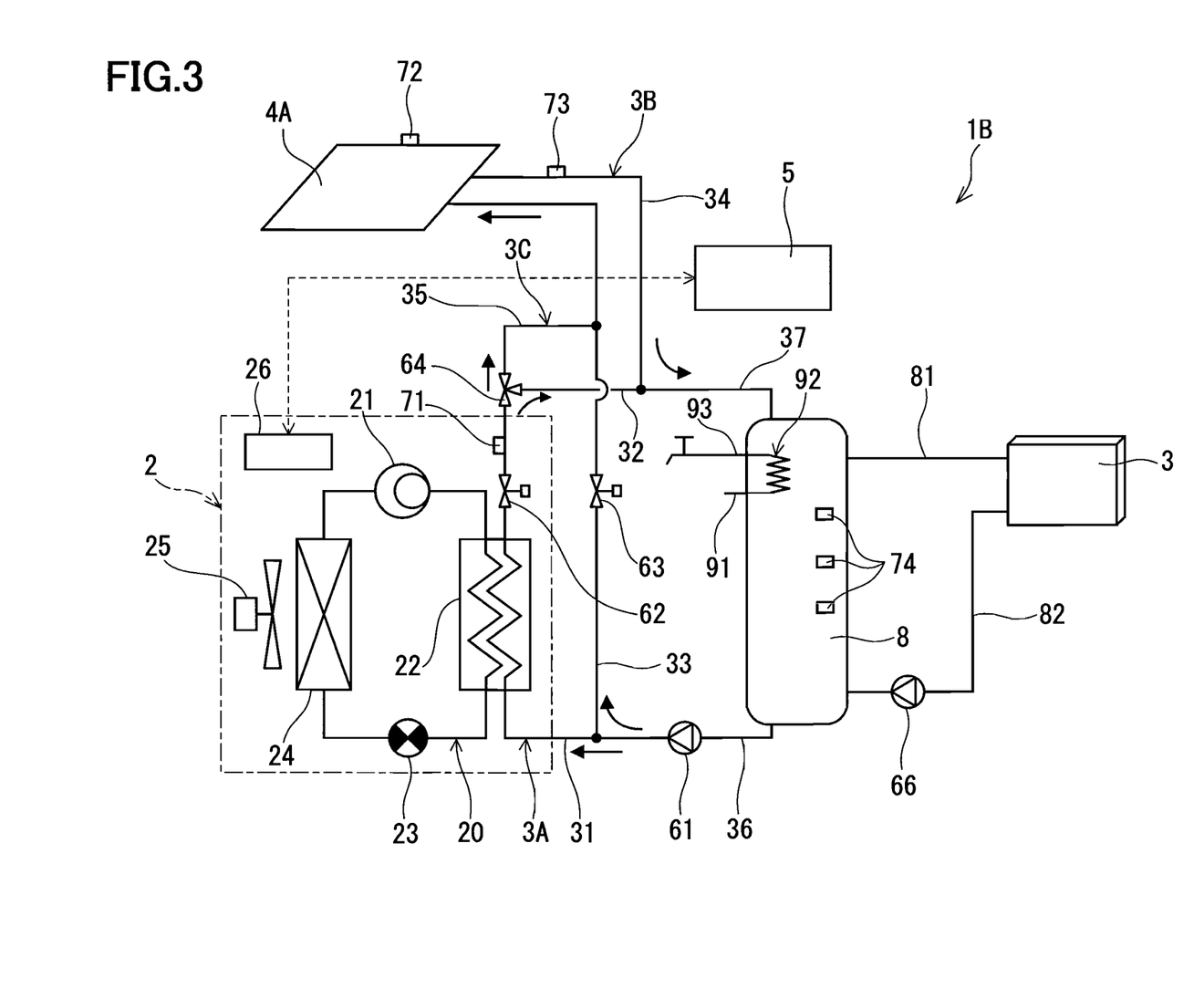
FIG. 3 is a schematic diagram of a liquid circulation heating system according to a second embodiment of the present invention.
Figure 4:
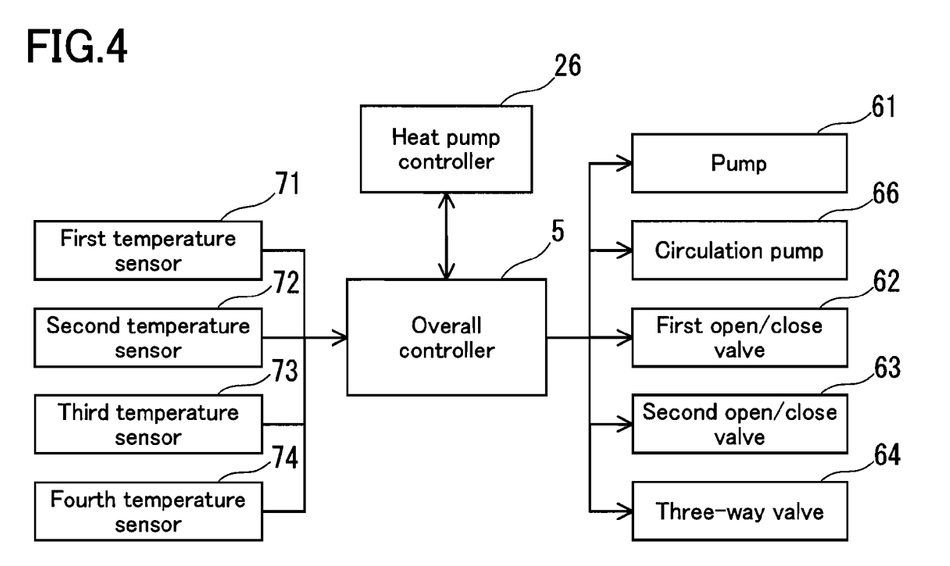
FIG. 4 is a block diagram of the liquid circulation heating system shown in FIG. 3.

Next, FIG. 3 shows a liquid circulation heating system 1B according to a second embodiment of the present invention, and FIG. 4 shows a block diagram thereof. In the present embodiment, the same components as those in the first embodiment are designated by the same reference numerals and no further description is given.

The liquid circulation heating system 1B of the second embodiment has basically the same configuration as the liquid circulation heating system 1A of the first embodiment, except that the heating radiator 3 is connected to the radiator 22 and the solar heating apparatus 4A respectively via the hot water storage tank 8.

The hot water storage tank 8 is a vertically cylindrical closed casing. One end of the main pipe 36 is connected to the upstream end of the first supply pipe 31 and the upstream end of the second supply pipe 33, and the other end of the main pipe 36 is connected to the lower portion of the hot water storage tank 8. One end of the junction pipe 37 is connected to the downstream end of the first recovery pipe 32 and the downstream end of the second recovery pipe 34, and the other end of the junction pipe 37 is connected to the upper portion of the hot water storage tank 8. The hot water storage tank 8 is filled with water.

During the hot water production process, when the pump 61 is rotated, the water flows from the hot water storage tank 8 to the main pipe 36, then flows through one of the first to third passages 3A to 3C or through the first and second passages 3A and 3B, and thereby hot water is produced. This hot water flows into the hot water storage tank 8 through the junction pipe 37. Thereby, the produced hot water is stored in the hot water storage tank 8 from the top thereof. On the peripheral surface of the hot water storage tank 8, a plurality of fourth temperature sensors 74 for determining how much hot water remains in the tank 8 are provided. The fourth temperature sensors 74 are connected to the overall controller 5.

In the present embodiment, a heat exchanger 92 for hot water supply is provided at an upper position in the hot water storage tank 8, and a water inlet pipe 91 and a hot water outlet pipe 93 are connected to this heat exchanger 92. That is, in the present embodiment, the produced hot water can be used as a heat source for hot water supply.

On the other hand, the inlet of the heating radiator 3 is connected to the upper portion of the hot water storage tank 8 by a feed pipe 81, and the outlet of the heating radiator 3 is connected to the lower portion of the hot water storage tank 8 by a return pipe 82. In the present embodiment, a circulation pump 66 is provided in the return pipe 82, but the circulation pump 66 may be provided in the feed pipe 81. The circulation pump 66 is connected to the overall controller 5. When the circulation pump 66 is rotated, the hot water stored in the hot water storage tank 8 is fed to the heating radiator 3 through the feed pipe 81, and the hot water is returned to the hot water storage tank 8 through the return pipe 82 after radiating heat in the heating radiator 3.

Next, the control operations performed by the overall controller 5 of the second embodiment are described specifically.

⟨Heat Storage Operation Using Heat Pump Alone⟩

In the case where the amount of sunlight received is insufficient, for example, on a rainy day, (e.g., in the case where the amount of sunlight detected by a sunlight amount sensor is a specified amount or less), when the overall controller 5 determines that the amount of hot water remaining in the tank is less than the required amount based on the temperatures detected by the fourth temperature sensors 74, it performs a heat storage operation using the heat pump alone. Specifically, the overall controller 5 opens the first open/close valve 62 fully and closes the second open/close valve 63 fully. The overall controller 5 also switches the three-way valve 64 so that the upstream side of the first recovery pipe 32 communicates with the downstream side thereof. Then, the overall controller 5 rotates the pump 61 and sends an operation start signal to the heat pump controller 26. Thereby, the water is heated in the radiator 22 to produce hot water. The overall controller 5 also controls the rotational rate of the pump 61 to regulate the flow rate of the water flowing through the first passage 3A so that the temperature of the water detected by the first temperature sensor 71 becomes a specified temperature (for example, 65° C.).

⟨Heat Storage Operation Using Solar Heating Apparatus Alone⟩

In the case where a sufficient amount of sunlight is received and the surface temperature of the solar collector detected by the second temperature sensor 72 is equal to or higher than a predetermined first target temperature (for example, 70° C.), when the overall controller 5 determines that the amount of hot water remaining in the tank is less than the required amount based on the temperatures detected by the fourth temperature sensors 74, it performs a heat storage operation using the solar heating apparatus alone. Specifically, the overall controller 5 closes the first open/close valve 62 fully, opens the second open/close valve 63, and rotates the pump 61. Thereby, the water is heated in the solar heating apparatus 4A to produce hot water. The overall controller 5 also controls the rotational rate of the pump 61 to regulate the flow rate of the water flowing through the second passage 3B so that the temperature of the water detected by the third temperature sensor 73 becomes a specified temperature (for example, 65° C.).

⟨Parallel Heat Storage Operation⟩

In the case where a sufficient amount of sunlight is received and the surface temperature of the solar collector detected by the second temperature sensor 72 is equal to or higher than the above predetermined first target temperature, when the overall controller 5 determines that an extremely small amount of hot water remains in the tank based on the temperatures detected by the fourth temperature sensors 74, it performs a parallel heat storage operation for heating the water simultaneously by using both the heat pump 2 and the solar heating apparatus 4A. Specifically, the overall controller 5 opens both the first open/close valve 62 and the second open/close valve 63 fully. The overall controller 5 also switches the three-way valve 64 so that the upstream side of the first recovery pipe 32 communicates with the downstream side thereof. Then, the overall controller 5 rotates the pump 61 and sends an operation start signal to the heat pump controller 26. Thereby, the water is heated in the radiator 22 and the solar heating apparatus 4A in parallel to produce hot water. The overall controller 5 also controls the rotational rate of the pump 61, the opening of the first open/close valve 62, and the opening of the second open/close valve 63 to regulate the flow rate of the water flowing through the first passage 3A and the flow rate of the water flowing through the second passage 3B so that the temperature of the water detected by the first temperature sensor 71 becomes a specified temperature (for example, 65° C.) and the temperature of the water detected by the third temperature sensor 73 becomes a specified temperature (for example, 65° C.).

As described above, in the present embodiment, the three-way valve 64 is provided, which enables the above-mentioned parallel heat storage operation. Therefore, the hot water can be supplied to the hot water storage tank 8 in a short time.

⟨Serial Heat Storage Operation⟩

In the case where a sufficient amount of sunlight is received and the surface temperature of the solar collector detected by the second temperature sensor 72 is equal to or higher than a predetermined second target temperature (for example, 80° C.), when the overall controller 5 determines that the amount of hot water remaining in the tank is less than the required amount based on the temperatures detected by the fourth temperature sensors 74, it performs a serial heat storage operation for heating the water using the heat pump 2 and then further heating the water using the solar heating apparatus 4A. In this case, the overall controller 5 opens the first valve 62 fully and closes the second valve 63 fully, and switches the three-way valve 64 so that the upstream side of the first recovery pipe 32 communicates with the bypass pipe 35. Then, the overall controller 5 rotates the pump 61 and sends an operation start signal to the heat pump controller 26. Thereby, the water flows through the third passage 3C. During the flow through the third passage 3C, the water first is heated to some extent in the radiator 22 (for example, the temperature of the water is raised to 40 to 42° C.), and then the water further is heated in the solar heating apparatus 4A. Thus, hot water is produced. The overall controller 5 also controls the rotational rate of the pump 61 to regulate the flow rate of the water flowing through the third passage 3C so that the temperature of the water detected by the third temperature sensor 73 becomes a specified temperature (for example, 70° C.).

As described above, in the present embodiment, the bypass pipe 35 and the three-way valve 64 are provided, which enables the above-mentioned serial heat storage operation. Therefore, the temperature increase required from the heat pump 2 can be reduced. As a result, energy conservation further can be enhanced.

⟨Air-Heating Operation⟩

When a user turns on a heating switch (not shown), the overall controller 5 rotates the circulation pump 66. Thereby, the hot water stored in the hot water storage tank 8 is fed to the heating radiator 3, where heat is radiated from the hot water. Thus, air-heating is performed.

The advantageous effects obtained in the liquid circulation heating system 1B of the second embodiment described above can be similar to those in the liquid circulation heating system 1A of the first embodiment.

In the present embodiment, the main pipe 36 and the junction pipe 37 are provided, but they may be omitted. Instead, the liquid circulation heating system 1B of the present embodiment may be configured such that the upstream end of the first supply pipe 31 and the upstream end of the second supply pipe 33 are connected directly to the lower portion of the hot water storage tank 8 and the downstream end of the first recovery pipe 32 and the downstream end of the second recovery pipe 34 are connected directly to the upper portion of the hot water storage tank 8. In this case, the first supply pipe 31 and the second supply pipe 33, respectively, may be provided with pumps to omit the first open/close valve 62 and the second open/close valve 63. However, in the case where the first supply pipe 31 and the second supply pipe 33 are connected to the tank via the main pipe 36 and the pump 61 is provided in that main pipe 36, as in the present embodiment, the total number of pumps in the system can be reduced, which simplifies the configuration of the system. In addition, if the first recovery pipe 32 and the second recovery pipe 34 also are connected to the tank via the junction pipe 37, the configuration of the system further can be simplified.

Third Embodiment

Figure 5:
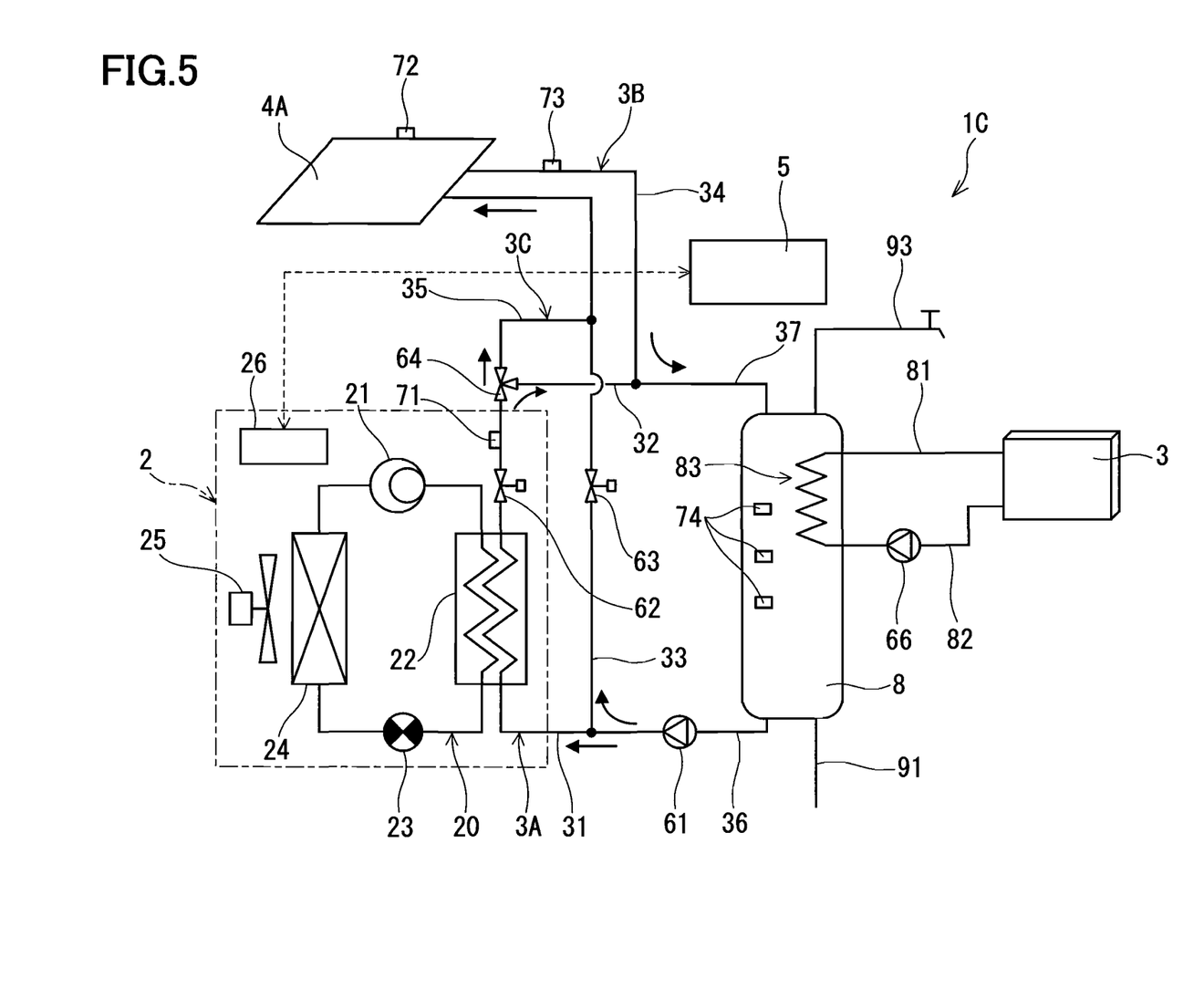
FIG. 5 is a schematic diagram of a liquid circulation heating system according to a third embodiment of the present invention.

Next, FIG. 5 shows a liquid circulation heating system 1C according to a third embodiment of the present invention. In the present embodiment, the same components as those in the first and second embodiments are designated by the same reference numerals and no further description is given.

In the liquid circulation heating system 1C of the third embodiment, hot water stored in the hot water storage tank 8 can be used directly for hot water supply. Specifically, the water inlet pipe 91 is connected to the lower portion of the hot water storage tank 8, and the hot water outlet pipe 93 is connected to the upper portion of the hot water storage tank 8. At an upper position in the hot water storage tank 8, a heat exchanger 83 for exchanging heat between the hot water stored in the hot water storage tank 8 and a secondary liquid is provided. The heat exchanger 83 is connected to the heating radiator 3 by the feed pipe 81 and the return pipe 82. When the circulation pump 66 is rotated, the secondary liquid heated in the heat exchanger 83 is fed to the heating radiator 3 through the feed pipe 81, and the secondary liquid is returned to the heat exchanger 83 through the return pipe 82 after radiating heat in the heating radiator 3. As the secondary liquid, for example, an antifreeze liquid can be used, but water preferably is used because it is available at low cost and in large quantities.

Since the overall controller 5 performs control in the same manner as in the second embodiment, the description thereof is not repeated here. It should be noted, however, that during the air-heating operation, the secondary liquid that has exchanged heat with the hot water stored in the hot water storage tank 8 radiates heat in the heating radiator 3, that is, the heat of the hot water is transferred to the heating radiator 3 via the secondary liquid, and thereby air-heating is performed.

The advantageous effects obtained in the liquid circulation heating system 1C having such a configuration can be similar to those in the liquid circulation heating system 1A of the first embodiment.

Other Embodiments

Figure 6:
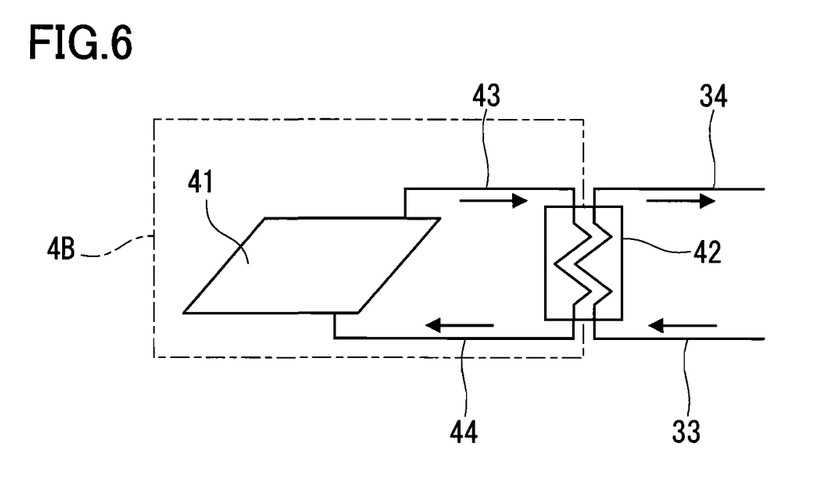
FIG. 6 is a schematic diagram showing a modified solar heating apparatus.

In each of the above embodiments, a solar collector is used as the solar heating apparatus 4A. The solar heating apparatus of the present invention may, however, be a solar heating apparatus 4B as shown in FIG. 6. This solar heating apparatus 4B is a solar heater that provides solar heat to the liquid via a heating medium, and includes a solar collector 41 for providing solar heat to the heating medium, a heat exchanger 42 for exchanging heat between the heating medium and the water, and pipes 43 and 44 for connecting the solar collector 41 and the heat exchanger 42. The second supply pipe 33 and the second recovery pipe 34 are connected to the heat exchanger 42. In a liquid circulation heating system including the solar heating apparatus 4B having such a configuration, an antifreeze liquid can be used as a heating medium. Such a liquid circulation heating system is suitable for use in cold climates.

The water also can be heated by only the parallel air-heating operation or the parallel heat storage operation using both the heat pump 2 and the solar heating apparatus 4A (or 4B), without the bypass pipe 35 and the three-way valve 64. In this case, the second open/close valve 63 may be provided in the second recovery pipe 34.

In each of the above embodiments, as an example of the case of an insufficient amount of sunlight received, the case where the amount of sunlight detected by the sunlight amount sensor is a specified amount or less is described. The overall controller 5 may, however, determine that the amount of sunlight received is insufficient when the surface temperature of the solar collector detected by the second temperature sensor 72 is equal to or lower than a specified temperature (for example, 40° C.).

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A liquid circulation heating system for performing air-heating by heating a liquid to produce a heated liquid and releasing heat of the heated liquid from a heating radiator, the system comprising:
    a heat pump circuit for circulating a refrigerant, the heat pump circuit having a refrigerant radiator for heating the liquid by radiating heat from the refrigerant; and
    a solar heating apparatus for heating the liquid by solar heat,
wherein a first passage passing through the refrigerant radiator and a second passage passing through the solar heating apparatus are formed as passages through which the liquid flows to produce the heated liquid,
the first passage has a first supply pipe for supplying the liquid to the refrigerant radiator, and a first recovery pipe for recovering the liquid heated in the refrigerant radiator,
the second passage has a second supply pipe for supplying the liquid to the solar heating apparatus, and a second recovery pipe for recovering the liquid heated in the solar heating apparatus, and
the system further comprises:
    a main pipe having a first end connected directly to an upstream end of the first supply pipe and an upstream end of the second supply pipe,
    a bypass pipe for connecting the first recovery pipe and the second supply pipe, the bypass pipe being connected directly to the first recovery pipe and the second supply pipe;
    a switching member for determining whether the liquid heated in the refrigerant radiator is allowed to flow to a downstream side of the first recovery pipe or to flow to the bypass pipe; and
    a junction pipe having a first end connected directly to a downstream end of the first recovery pipe and a downstream end of the second recovery pipe.

2. The liquid circulation heating system according to claim 1,
wherein the main pipe is provided with a pump for allowing the liquid to flow from a second end of the main pipe to the first end thereof, and
the first supply pipe or the first recovery pipe is provided with a first open/close valve, and the second supply pipe or the second recovery pipe is provided with a second open/close valve.

3. The liquid circulation heating system according to claim 2, wherein the bypass pipe directly connects at an intermediate point of the first recovery pipe located on a downstream side of the first open/close valve and at an intermediate point of the second supply pipe located on a downstream side of the second open/close valve.

4. The liquid circulation heating system according to claim 1, wherein the second end of the main pipe and a second end of the junction pipe are connected directly to the heating radiator.

5. A liquid circulation heating system for performing air-heating by heating a liquid to produce a heated liquid and releasing heat of the heated liquid from a heating radiator, the system comprising:
a heat pump circuit for circulating a refrigerant, the heat pump circuit having a refrigerant radiator for heating the liquid by radiating heat from the refrigerant; and
a solar heating apparatus for heating the liquid by solar heat,
wherein a first passage passing through the refrigerant radiator and a second passage passing through the solar heating apparatus are formed as passages through which the liquid flows to produce the heated liquid,
the first passage has a first supply pipe for supplying the liquid to the refrigerant radiator, and a first recovery pipe for recovering the liquid heated in the refrigerant radiator,
the second passage has a second supply pipe for supplying the liquid to the solar heating apparatus, and a second recovery pipe for recovering the liquid heated in the solar heating apparatus, and
the system further comprising:
a main pipe having a first end connected directly to an upstream end of the first supply pipe and an upstream end of the second supply pipe,
a bypass pipe for connecting the first recovery pipe and the second supply pipe, the bypass pipe being connected directly to the first recovery pipe and the second supply pipe;
a switching member for determining whether the liquid heated in the refrigerant radiator is allowed to flow to a downstream side of the first recovery pipe or to flow to the bypass pipe;
a tank for storing the produced heated liquid, the tank having a lower portion connected directly to a second end of the main pipe, and having an upper portion connected directly to a downstream end of the first recovery pipe and a downstream end of the second recovery pipe, or when the downstream end of the first recovery pipe and the downstream end of the second recovery pipe are connected directly to a first end of a junction pipe, connected directly to a second end of the junction pipe;
a feed pipe for feeding the heated liquid stored in the tank to the heating radiator; and
a return pipe for returning the heated liquid to the tank after the heated liquid radiates heat in the heating radiator.

6. A liquid circulation heating system for performing air-heating by heating a liquid to produce a heated liquid and releasing heat of the heated liquid from a heating radiator, the system comprising:
a heat pump circuit for circulating a refrigerant, the heat pump circuit having a refrigerant radiator for heating the liquid by radiating heat from the refrigerant; and
a solar heating apparatus for heating the liquid by solar heat,
wherein a first passage passing through the refrigerant radiator and a second passage passing through the solar heating apparatus are formed as passages through which the liquid flows to produce the heated liquid,
the first passage has a first supply pipe for supplying the liquid to the refrigerant radiator, and a first recovery pipe for recovering the liquid heated in the refrigerant radiator,
the second passage has a second supply pipe for supplying the liquid to the solar heating apparatus, and a second recovery pipe for recovering the liquid heated in the solar heating apparatus, and
the system further comprising:
a main pipe having a first end connected directly to an upstream end of the first supply pipe and an upstream end of the second supply pipe,
a bypass pipe for connecting the first recovery pipe and the second supply pipe, the bypass pipe being connected directly to the first recovery pipe and the second supply pipe;
a switching member for determining whether the liquid heated in the refrigerant radiator is allowed to flow to a downstream side of the first recovery pipe or to flow to the bypass pipe;
a tank for storing the produced heated liquid, the tank having a lower portion connected directly to a second end of the main pipe, and having an upper portion connected directly to a downstream end of the first recovery pipe and a downstream end of the second recovery pipe, or when the downstream end of the first recovery pipe and the downstream end of the second recovery pipe are connected directly to a first end of a junction pipe, connected directly to a second end of the junction pipe;
a heat exchanger, disposed in the tank, for exchanging heat between the heated liquid stored in the tank and a secondary liquid;
a feed pipe for feeding the secondary liquid to the heating radiator after the secondary liquid is heated in the heat exchanger; and
a return pipe for returning the secondary liquid to the heat exchanger after the secondary liquid radiates heat in the heating radiator.

7. The liquid circulation heating system according to claim 5, wherein the return pipe or the feed pipe is provided with a circulation pump.

8. The liquid circulation heating system according to claim 6, wherein the return pipe or the feed pipe is provided with a circulation pump.

9. The liquid circulation heating system according to claim 1, wherein the solar heating apparatus is a solar collector that provides solar heat directly to the liquid.

10. The liquid circulation heating system according to claim 1, wherein the solar heating apparatus is a solar heater that provides solar heat to the liquid via a heating medium.

11. The liquid circulation heating system according to claim 1, wherein the liquid is water, and the heated liquid is hot water.

12. The liquid circulation heating system according to claim 5, wherein the solar heating apparatus is a solar collector that provides solar heat directly to the liquid.

13. The liquid circulation heating system according to claim 5, wherein the solar heating apparatus is a solar heater that provides solar heat to the liquid via a heating medium.

14. The liquid circulation heating system according to claim 5, wherein the liquid is water, and the heated liquid is hot water.

15. The liquid circulation heating system according to claim 6, wherein the solar heating apparatus is a solar collector that provides solar heat directly to the liquid.

16. The liquid circulation heating system according to claim 6, wherein the solar heating apparatus is a solar heater that provides solar heat to the liquid via a heating medium.

17. The liquid circulation heating system according to claim 6, wherein the liquid is water, and the heated liquid is hot water.

* * * * *